(12) United States Patent
Young

(10) Patent No.: US 7,710,748 B2
(45) Date of Patent: May 4, 2010

(54) AC/DC CONVERTER COMPRISING PLURAL CONVERTERS IN CASCADE

(75) Inventor: George Young, Blackrock (IE)

(73) Assignee: Texas Instruments (Cork) Limited, Dublin (IE)

( * ) Notice: Subject to any disclaimer, the term of this patent is extended or adjusted under 35 U.S.C. 154(b) by 509 days.

(21) Appl. No.: 11/578,235

(22) PCT Filed: Apr. 13, 2005

(86) PCT No.: PCT/IE2005/000041

§ 371 (c)(1),
(2), (4) Date: Mar. 30, 2007

(87) PCT Pub. No.: WO2005/101632

PCT Pub. Date: Oct. 27, 2005

(65) Prior Publication Data

US 2008/0031014 A1 Feb. 7, 2008

(30) Foreign Application Priority Data

Apr. 13, 2004 (IE) ................................. S2004/0258

(51) Int. Cl.
*H02M 5/45* (2006.01)
*H02M 7/00* (2006.01)
*H03H 5/10* (2006.01)

(52) U.S. Cl. ........................... 363/37; 363/125; 323/366

(58) Field of Classification Search .................... 363/98, 363/101, 108, 125, 131, 143, 37, 44–48, 363/49, 142; 323/901, 908, 366
See application file for complete search history.

(56) References Cited

U.S. PATENT DOCUMENTS 5,138,547 A * 8/1992 Swoboda ..................... 363/143

(Continued)

FOREIGN PATENT DOCUMENTS

WO WO-03/094333 A1 11/2003

OTHER PUBLICATIONS

Ayyanar R. et al., IEEE Transactions on Industry Applications, IEEE, Inc. New York, US, vol. 37, No. 2 Mar. 2001, pp. 559-565.

*Primary Examiner*—Jessica Han
*Assistant Examiner*—Emily Pham
(74) *Attorney, Agent, or Firm*—John J. Patti; Wade J. Brady, III; Frederick J. Telecky, Jr.

(57) ABSTRACT

The present invention relates to an AC/DC converter (1) of the type having an AC/DC conversion stage (2) and a DC/DC conversion stage (3), the AC/DC conversion stage (2) comprising an input filter stage (4), an input rectifier stage (5) and a tracking boost converter stage. The boost converter stage in turn comprises an input choke (10), a boost diode (16) and a bulk capacitor (17). The bulk capacitor (17) is arranged to store a range of voltages substantially proportional to the input voltage of the converter. The DC/DC stage (3) is arranged to receive the range of voltages from the bulk capacitor (17) and is controllable to provide a desired DC output regardless of the voltage received from the bulk capacitor (17). This is achieved through careful combination of components and use of output feedback control to control the voltage applied to an isolated transformer (41) in the DC/DC stage.

14 Claims, 4 Drawing Sheets

U.S. PATENT DOCUMENTS

| | | | |
|---|---|---|---|
| 5,157,592 A * | 10/1992 | Walters | 363/17 |
| 5,691,627 A * | 11/1997 | Shum | 323/222 |
| 6,344,986 B1 * | 2/2002 | Jain et al. | 363/89 |
| 6,735,098 B2 * | 5/2004 | Hussein et al. | 363/56.03 |
| 6,788,554 B2 * | 9/2004 | Havanur | 363/21.06 |
| 6,807,073 B1 * | 10/2004 | Scarlatescu | 363/34 |

* cited by examiner

AC/DC CONVERTER COMPRISING PLURAL CONVERTERS IN CASCADE

CROSS-REFERENCE TO RELATED APPLICATIONS

This application claims priority to Intl. Appl. No. PCT/IE2005/000041, which claims priority to Irish Patent Appl. No. S2004/0258.

TECHNICAL FIELD

The present invention relates generally to an AC/DC converter and, more particularly, to an AC/DC converter with an AC/DC conversion stage and a DC/DC conversion stage.

BACKGROUND

AC/DC converters have been known for many years and are used extensively particularly throughout the electronics industry. These converters take power from a utility lines or mains to supply and deliver a predetermined DC output, typically at the lower voltages, which are generally required by electronic circuitry as used in industrial, communications, computing, medical and general applications. Typically, an AC/DC converter comprises a pre-regulator which performs a "power factor correction," namely, it draws current largely proportional to the input voltage and then feeds a boosted line voltage, typically at 400V, to a capacitor which stores energy during the low voltage parts of the AC input cycle. This capacitor then feeds a DC/DC converter which provides the required DC voltage for the circuitry in question.

There are, however, problems associated with the known types of AC/DC converters. First of all, many of these converters experience problems with the filtering of electromagnetic interference (EMI) caused by the operation of the converter. Every switching stage of the converter generates interference, and modern power converters operate with switching at a frequency typically in the range of 20 KHz to 1 MHz or higher, and such switching can generate significant interference to other electrical equipment. This interference is gerenally reduced by using more suitable switching techniques and/or filtering. Particular challenges in this area lie in filtering the current ripple in the input boost choke or flyback stage as typically used in power-factor correction stages and also in limiting the common-mode noise generated in the isolation transformer between the line/mains and the electronic circuitry being fed by the supply. Industry-led and regulatory standards apply to EMI performance and safety isolation in power converters and it is important to provide a power converter that adheres to these standards.

Another design problem associated with the known types of AC/DC converters concerns the efficiency of the converters. In particular, there is a design challenge in getting a generally optimum efficiency from power converters across the wide range of input voltages, where the input voltage cycle peak varies from typically 1.414*85V to 1.414*265V depending on the country. Furthermore, one increases efficiency at the different points of the operating cycle between 0V and the peak input voltage value. Design of AC/DC converters with an approximately fixed value of bulk capacitor voltage typically involves compromises in optimizing efficiency across the differing line voltages.

In many instances, AC/DC converters have to be capable of operating in dual mode, namely, be capable of taking both low-line voltages (nominally 110V, as is common in the US and Japan) and high-line voltages (nominally 220V to 240V as is common in Europe). It has been known to implement an AC/DC converter having a dual mode input stage whereby either low-line or high-line input voltages can be handled adequately and converted to provide power to a piece of equipment. However, there are various problems with these types of converters including those outlined above.

SUMMARY

It is an object of the present invention to provide an AC/DC converter of the type comprising a dual mode input stage which will overcome at least some of the problems associated with the known constructions of AC/DC converters.

According to a preferred embodiment of the present invention, there is provided an AC/DC converter comprising an AC/DC conversion stage and a DC/DC conversion stage, the AC/DC conversion stage comprising a dual mode input stage having an input filter and an input rectification circuit, the AC/DC conversion stage further comprising a pre-regulator tracking boost converter stage having an input boost choke, a boost diode and a bulk capacitor, the bulk capacitor being capable of storing a range of DC voltages thereon substantially proportional to the input AC voltage, characterised in that the DC/DC conversion stage comprises a controller, a pre-regulator buck converter stage and an output isolation transformer stage, the pre-regulator buck converter stage being controlled using a feedback from the output of the converter.

By having such a converter, it is possible to provide a converter that is efficient across a wide range of different input voltages. The tracking boost converter will operate to provide a voltage across the bulk capacitor approximately proportional to the input voltage. This voltage across the bulk capacitor is then used by the buck converter to provide the input to the output isolation transformer. By having the feedback control from the output, the converter will be able to operate the isolation transformer stage with a fixed voltage ratio and the buck converter can adapt the voltage received from the bulk capacitor to give a quasi-fixed input voltage to the isolation transformer. This will result in a highly efficient controller across the range of input voltages.

In accordance with a preferred embodiment of the present invention, there is provided an AC/DC converter in which the controller has means to operate the converter in discontinuous mode at high input voltages and in predominantly continuous mode at low input voltages.

By operating the converter in this fashion, the converter may be operated in an efficient manner across the range of input voltages. At low input voltages, switching losses are reduced by a factor of between 2 and 4 compared with a typical AC/DC converter mainly due to the fact that the converter is operating with a lower bulk capacitor voltage (approximately 200V as opposed to 430V) than would normally be the case. At high voltages, conduction losses are also lower due to lower input current for the required power. The dominant loss component at high voltages tends to be associated with the reverse recovery properties of the boost diode and a freewheeling diode. If the converter is operated in discontinuous mode, the boost diode and the freewheeling diode are normally not conducting current at the time the main switch turns on, thus eliminating this reverse recovery problem and reducing losses. The converter will operate in predominantly continuous mode at low voltages. This will depend on the requirement of the load and for particularly light loads the converter may not be required to operate in continuous mode.

In accordance with a preferred embodiment of the present invention, there is provided an AC/DC converter in which the pre-regulator tracking boost converter stage is further provided with a hold-up extension circuit comprising an auxiliary capacitor. In this way, it is possible to ensure that the converter can provide sufficient hold-up power in the event of a power interruption at low-line voltages. The auxiliary capacitor can be switched in to the circuit as desired.

In accordance with a preferred embodiment of the present invention, there is provided an AC/DC converter in which the hold-up extension circuit further comprises a standby circuit to charge the auxiliary capacitor. Alternatively, the hold-up extension circuit may further comprise a separate boost circuit to charge the auxiliary capacitor.

In accordance with a preferred embodiment of the present invention, there is provided an AC/DC converter in which there is provided an inrush current limiting circuit comprising a resistive element. By having such a device, it will be possible to protect the converter components from the inrush current typically experienced on power up of the converter.

In accordance with a preferred embodiment of the present invention, there is provided an AC/DC converter in which the inrush current limiting circuit further comprises a semi-controlled bypass circuit operable to bypass the resistive element after start up. This is seen as particularly suitable as the inrush current limiting circuit resistive element will have a loss associated therewith which is undesirable when attempting to achieve maximum efficiency of the converter during normal operating conditions. Once the protection against the inrush current is no longer required, the resistive element may be bypassed thereby effectively avoiding the loss associated therewith, optimizing the operating efficiency of the converter.

In accordance with a preferred embodiment of the present invention, there is provided an AC/DC converter in which the semi-controlled bypass circuit further comprises a pair of semi-controlled rectifying elements coupled to the input rectification circuit. Preferably, the semi controlled rectifying elements comprise semi-controlled diodes. By having semi-controlled diodes, these diodes can be configured so they effectively form part of the full bridge rectifier on the input when they are switched on, shorting out a second pair of diodes that form part of the full bridge on start-up as well as shorting out the resistive element. This is seen as an efficient way of by-passing the resistive element that is both reliable and relatively simple to operate.

In accordance with a preferred embodiment of the present invention, there is provided an AC/DC converter in which the resistive element further comprises a negative temperature co-efficient (NTC) thermistor.

In accordance with a preferred embodiment of the present invention, there is provided an AC/DC converter in which there is provided a ripple current filtering circuit, the ripple current filtering circuit comprising an additional winding on the input boost choke in series with an inductor and a capacitor arranged in series electrically with respect to each other. This is seen as a particularly simple way of eliminating the ripple current on the input choke thereby providing a more efficient converter.

In accordance with a preferred embodiment of the present invention, there is provided an AC/DC converter in which the isolation transformer is operated as a full duty-cycle isolation stage. By operating the isolation transformer as a full duty-cycle isolation stage it is possible to reduce the EMI as well as improve utilization of the transformer.

In accordance with a preferred embodiment of the present invention, there is provided an AC/DC converter in which the isolation transformer further comprises a planar transformer with windings integrated in a printed circuit board (PCB). By using a planar transformer the transformer will be well matched and it will be possible to eliminate most of the common mode currents in the transformer which is of significant benefit.

In accordance with a preferred embodiment of the present invention, there is provided an AC/DC converter in which there are provided balanced saturable reactors coupled at each terminal of the isolation transformer's secondary winding. By having balanced saturable reactors, it will be possible to limit the EMI as well as reduce the ringing on the output and contain the reverse recovery effects in the body diodes of the output synchronous rectifiers.

In accordance with a preferred embodiment of the present invention, there is provided an AC/DC converter in which there is provided a protection circuit operable by the controller, the protection circuit comprising a dump resistor coupled across the output of the pre-regulated buck converter stage. By having such a protection circuit, it will be possible to prevent damage to the capacitors, transformer elements and the switching devices that may be caused in the event of a transient excess voltage such as that caused by a reverse power flow from the converter output towards the input. The dump resistor will provide a path for the excess power to dissipate.

In accordance with a preferred embodiment of the present invention, there is provided an AC/DC converter in which the protection circuit further comprises a switching element to allow the converters to be operated in parallel without reverse power flow from one or more other converters. In this way, reverse power flow is avoided that could potentially cause damage to the converter components.

In accordance with a preferred embodiment of the present invention, there is provided an AC/DC converter in which the bulk capacitor voltage is adapted to provide an output DC voltage approximately proportional to the input AC voltage so that at low input line AC and low output line DC voltages in the order of 200V, the inductance of the input choke of the pre-regulator boost converter stage is so chosen that the boost converter operates in continuous mode and at a high input line AC voltage and high output DC voltages of the order of 400V operates in discontinuous mode. The inductance value of the input choke will affect the manner in which the controller operates the boost converter. By choosing an appropriate value of inductance, the controller will vary the duty cycle appropriately so that the converter operates the boost converter in discontinuous mode at high voltage. This will help to overcome the losses associated with the reverse recovery properties of the boost diode. Furthermore, by choosing the appropriate value of inductance, the controller can operate the boost converter in continuous mode at higher loads at low voltages without significant conduction losses.

In accordance with a preferred embodiment of the present invention, there is provided an AC/DC converter in which the hold-up capacitor is chosen to have a capacitance with a hold-up time of the order of 20 milliseconds.

In accordance with a preferred embodiment of the present invention, there is provided an AC/DC converter in which the DC/DC conversion stage further comprises a full bridge output stage and output rectifying elements having rectifying voltage after spike adjustments and normal de-rating slightly greater than the output voltage.

In accordance with a preferred embodiment of the present invention, there is provided an AC/DC converter in which the DC/DC conversion stage comprises a centre tapped rectifier whose rectifying voltage, after spike adjustments and normal de-rating, is slightly greater than twice the output voltage.

In accordance with a preferred embodiment of the present invention, there is provided an AC/DC converter in which there is provided a current sensing device monitoring the output of the converter.

In accordance with a preferred embodiment of the present invention, there is provided an AC/DC converter in which there is provided a voltage sensing device monitoring the output of the converter.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

The invention will be more clearly understood from the following description of some embodiments thereof, given by way of example only, with reference to the accompanying drawings, in which.

DETAILED DESCRIPTION

Figure 1:
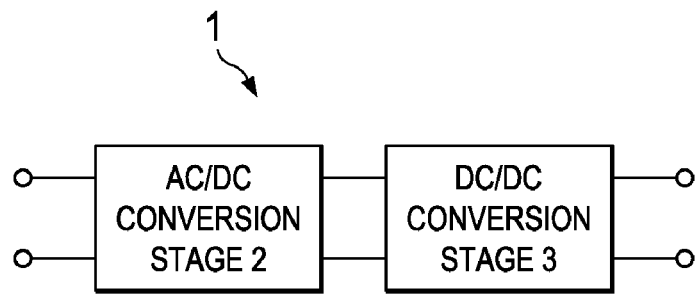
FIG. 1 is a circuit diagram of an example of an AC/DC converter in accordance with a preferred embodiment of the present invention.

Refer now to the drawings wherein depicted elements are, for the sake of clarity, not necessarily shown to scale and wherein like or similar elements are designated by the same reference numeral through the several views.

Referring to FIG. 1 of the drawings, reference numeral 1 generally designates an example of an AC/DC converter in accordance with a preferred embodiment of the present invention. AC/DC converter 1 generally comprises an AC/DC conversion stage 2 and a DC/DC conversion stage 3.

Figure 2:
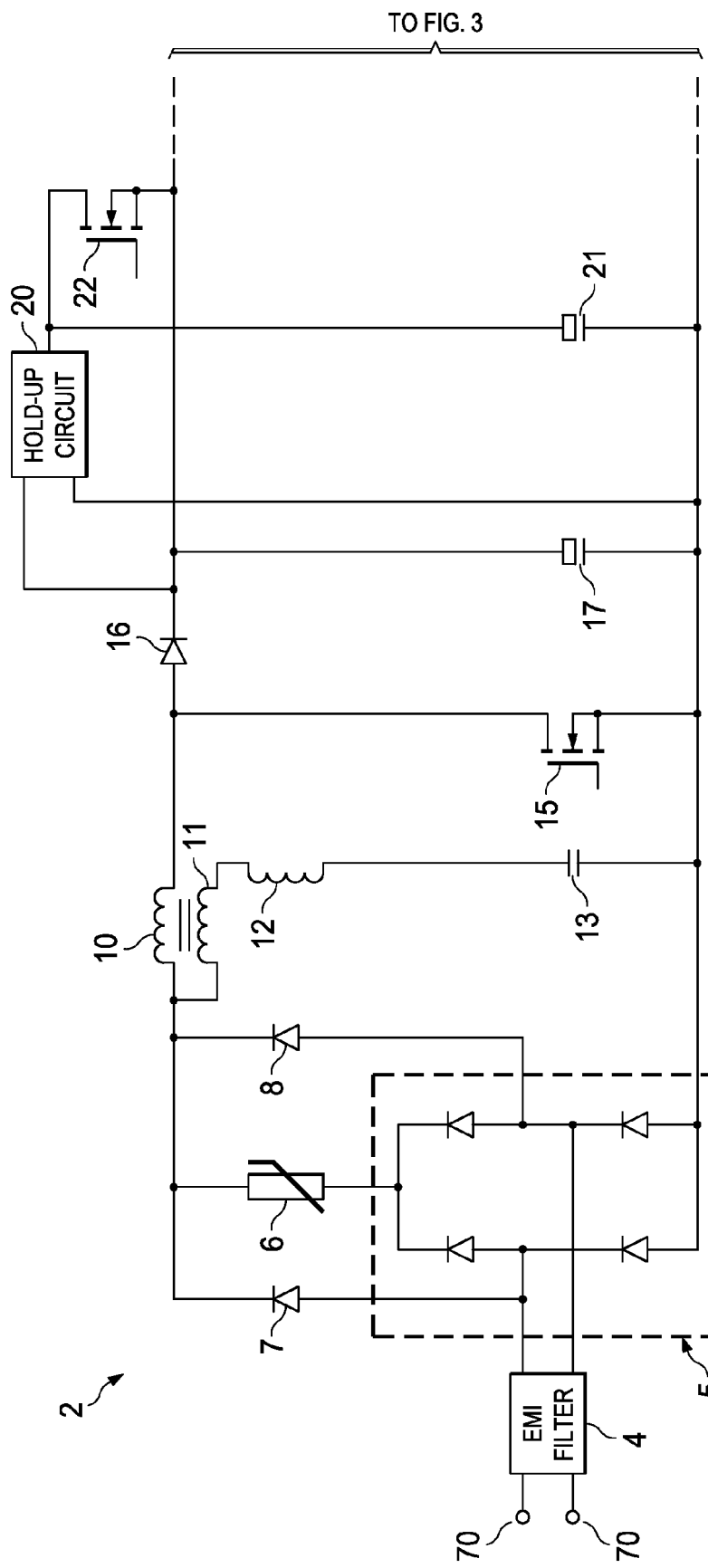
FIG. 2 is a circuit diagram of the AC/DC conversion stage of FIG. 1.

Turning to FIG. 2, the AC/DC conversion stage 2 can be seen in greater detail. AC/DC conversion stage 2 generally comprises input terminals 70 feeding an input Electromagnetic Interference (EMI) filter 4. The EMI filter 4 in turn feeds a rectifying bridge 5 (which generally comprises four diode). Bridge 5, in turn, feeds a negative temperature coefficient thermistor (NTC) 6 in turn combined with silicon controlled rectifiers (SCRs) or thyristors 7 and 8, which are coupled to the rectifying bridge 5. These SCRs 7 and 8, in turn, feed an input tracking boost converter choke, namely, an input choke 10 having an additional winding 11 feeding a shim inductor 12 and a capacitor 13 across a switch 15. A boost diode 16 and a bulk capacitor 17 are also provided. A hold-up extension circuit 20 is coupled across the bulk capacitor 17 for charging an auxiliary capacitor 21. The hold-up extension circuit 20 includes a hold-up extension feed 22.

In operation, the bulk capacitor voltage 17 is adapted to provide an output DC voltage that is approximately proportional to the input AC voltage so that at low-line AC and low output DC voltage of the order of 200V. The induction of the input choke, namely, the input choke 10 operates in continuous mode, and at high-input AC and high output DC of the order of the 400V, while the input choke 10 operates in discontinuous mode. Thus, the input capacitor, namely, the bulk capacitor 17, operates with continuous current to the input choke 10 at voltages such as low-line, typically 110V as is common in the US and Japan. Because one is operating with a bulk capacitor voltage, that is to say, a voltage at the capacitor 17 of typically 200V as compared with typically 400V in a conventional power factor coupled converter, switching losses are reduced by a factor between 2 and 4. Some components of the switching loss are proportional to the bulk capacitor voltage and others are proportion to the square of the bulk capacitor voltage. Thus the reduction is between approximately twice and four times in this instance. At higher line, typically 220V up to 240V, as found in Europe, the operation of the boost stage is primarily in discontinuous mode. At such voltages, conduction losses are lower, due to lower input current for the required power and the dominant loss component tends to be associated with the reverse recovery properties of the boost diode 16. If the conversion stage 2 operates in discontinuous mode, the boost diode 16 is normally not conducting current at the time the main switch turns on, thus eliminating this reverse recovery problem. When current ceases to flow in the boost diode 16, it is normal for the voltage on the switching device to oscillate and there is an opportunity to turn on the switch close to a "valley" in the voltage across it, thus minimizing losses in this component.

A purpose of this tracking boost stage is to get full benefit of dual-mode approach and allow the usage of less expensive components, in particular the boost diode 16. As is well appreciated to those skilled in the art, usage of the approaches developed in this area have been limited by among other things the difficulty in filtering the increased ripple current at high line and by the difficulty in designing the subsequent DC/DC conversion stage. A further difficulty is the greater challenge in obtaining effective holdup performance (i.e., the ability to maintain the output voltage with regulation for a period typically corresponding to loss of an input cycle of the AC line, as is increasingly been mandated by performance requirements). This requirement may also be in conflict with requirements in the area of inrush current limitation.

With the stage 2, the difficulty in filtering the increased ripple current is addressed by the usage of the ripple-cancellation approaches between the input EMI filter 4 and the additional winding 11. Since the capacitor is placed after the rectifying and voltage limiting elements, it does not have to have the surge requirements associated with a capacitor placed directly across the line (typically, known as an "X2" capacitor).

A so-called hold-up issue occurs because the energy to run the DC load during the missing cycle of input line/mains voltage is provided by the bulk capacitor 17, and operating at typically 200V in the mode of operation associated with a low-line condition means that the holdup energy in this capacitor 17 is one fourth of the energy stored at 400V, the approximate voltage corresponding to high-line operation. While it would be possible to address this issue by fitting a somewhat larger capacitance capacitor 17 than would be normal, as in the case of conventional boost power factor correction stage, which is more practical at power levels up to 400 watts with present equipment, the problem is overcome with the stage 2 by fitting the hold-up extension circuit 20 which allows for the auxiliary capacitor 22 to be charged. This can be typically done by a standby circuit provided in many converter types or by a separate boost circuit and then used to provide the bulk energy to maintain the output DC voltage at the required level during absence of the input mains/line voltage by switching in hold-up extension feed 22. This approach is more suited to higher power levels where the extra cost of the holdup control circuitry 20 is justified.

Increased capacitance values also generally require a more advanced inrush-current limiting circuit than required in the traditional power factor correction circuits. Inrush current limiting has historically used NTC thermistors, such as NTC thermistor 6, whose resistance drops as current is drawn, corresponding to normal operation. Initially, (when cold) such devices have a high resistance which limits inrush current charging the bulk capacitors through the rectifying elements. However, the on-resistance of the NTC thermistor 6 causes further losses, defeating the objective of increasing efficiency. This is overcome by combining the NTC thermistor 6 with the SCRs 7 and 8 coupled to the rectifier bride 5, as illustrated. These elements, when switched on, have losses similar to those of conventional elements and thus there is no loss penalty.

It will be appreciated that, alternatively, the NTC thermistor 6 may be bypassed by a semiconductor device such as a triac, which, however, typically has a material forward voltage drop resulting in losses. An alternative is usage of an electromechanical element such as a relay, with reliability issues typically associated with electromechanical devices and frequently with the need for power-consuming control circuitry to maintain the relay "on" in normal operation or indeed, a fixed resistor could be used in the position, as shown in the drawings, but usage of an NTC thermistor 6 usually allows a smaller element to be used and is more effective in brownout conditions and in recovery from a brief mains "outage".

Figure 3:
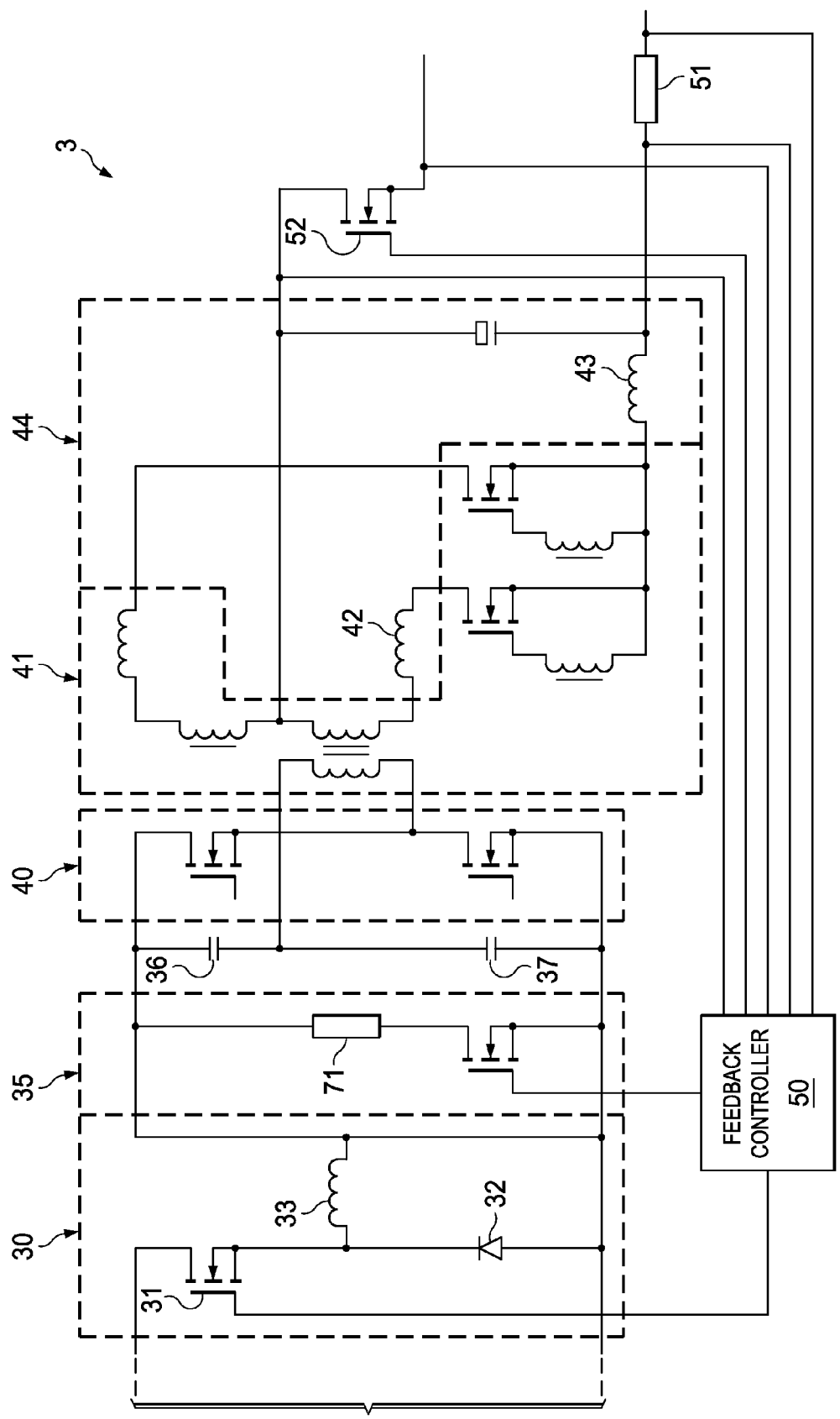
FIG. 3 is a circuit diagram of the DC/DC conversion stage of FIG. 1.

Referring now to FIG. 3, the DC/DC conversion stage 3 comprises an input buck converter stage 30. Stage 30 generally comprises an input buck drive FET 31 feeding a free-wheeling diode 32 that is coupled to inductor 33 which, in turn, feeds an intermediate voltage level stage 35 and to a pair of output capacitors 36 and 37, which, in turn, feed a full duty cycle stage 40. The full duty cycle stage 40, in turn, feeds a planar transformer 41, which, in turn, feeds output inductors 42 and 43 of an output rectifying stage 44. A feedback controller 50 couples the input buck converter stage 30 with the output for both current and voltage sensing by means of a current sensor 51 and a voltage sensor, namely, a FET diode 52.

With use of a dual-mode input stage as described above, the DC/DC conversion stage 3 has to handle bulk capacitor voltage (spanning the range of typically 200V to 400V in most current requirements) to the fixed level ordinarily required in most load applications. The challenge of wide-range conversion at high efficiency is more complex in this case than when converting from an approximately fixed level such as the nominal 400V as obtained in the conventional converter approach. One also has the requirement for low EMI generation from the transformer.

The input buck converter stage 30, which is controlled in a feedback loop by the controller 50, measures the output voltage with a full duty cycle isolation stage. This is achieved by the use of the planar transformer 41 which facilitates a balanced construction, and along with full-duty cycle operation results in almost perfect cancellation of the common-mode currents than can be introduced in these transformers. The output rectifying elements 42 and 43 can also be limited in voltage while adjusted for spike effects and normal derating, to just over the output voltage in the case of full-bridge output stages and to just over twice the output voltage in the case of centre-tapped rectifiers. Deriving a gate drive signal, if synchronous rectification is used, from the main winding is also feasible, given that this voltage can be made proportional to the output voltage, which is normally adjustable over a relatively narrow range.

The implementation described in this specification permits the leakage inductance energy in the main transformer to be used to achieve very efficient zero-voltage switching. The small balanced saturable reactors or inductors 42 and 43 in series with the main transformer winding maintain the balance necessary to limit EMI and serve to reduce ringing on the output and to contain reverse recovery effects in the body diodes of the output synchronous rectifiers. Further operational and design aspects of this circuit are described below.

The input buck converter stage 30 operates typically at full load in discontinuous mode (i.e., with discontinuous inductor current) at high line voltage. This limits the reverse recovery effects in the free-wheeling diode 32. It will be noted that a synchronous rectifier can also be used. At low-line voltage, the inductor current (through inductor 33) is designed to be continuous. This limits conduction loss, and reverse recovery effects are materially less given the reduced voltage applied.

The capacitance on the output of the input buck converter stage 30, namely, the capacitors 36 and 37, is selected to allow the full-duty cycle stage to operate either as a current-fed stage or as a voltage-fed stage. In practice, a relatively low value of capacitance is selected here to allow for quasi-voltage fed operation of the full-bridge stage, resulting in easier containment of voltage spikes at switching under some load conditions through clamping of the voltage across the output rectifiers. When a centre-tapped output section is used, the output windings are closely coupled (i.e., the leakage inductance between these windings is minimal as compared with the leakage inductance between either secondary winding or the primary winding). The output choke is positioned such that the centre tap of the output stage is coupled to the positive output, with an inductor in the –ve "leg", when using conventional n-type FET switches or when using diodes in the conventional fashion.

It is important in this circuit that very close control be maintained on the intermediate capacitance of the capacitors 36 and 37. A protection circuit immediately switches in a power dump resistor 71 on detection of a fault condition, and simultaneously removes drive from the input buck converter stage 30 high-side switching element or FET 31. Further protection against reverse power flow is provided by use of a switched device, typically used also to allow converters to be operated in parallel without reverse power flow from one or more other converters into the converter in question.

Figure 4:
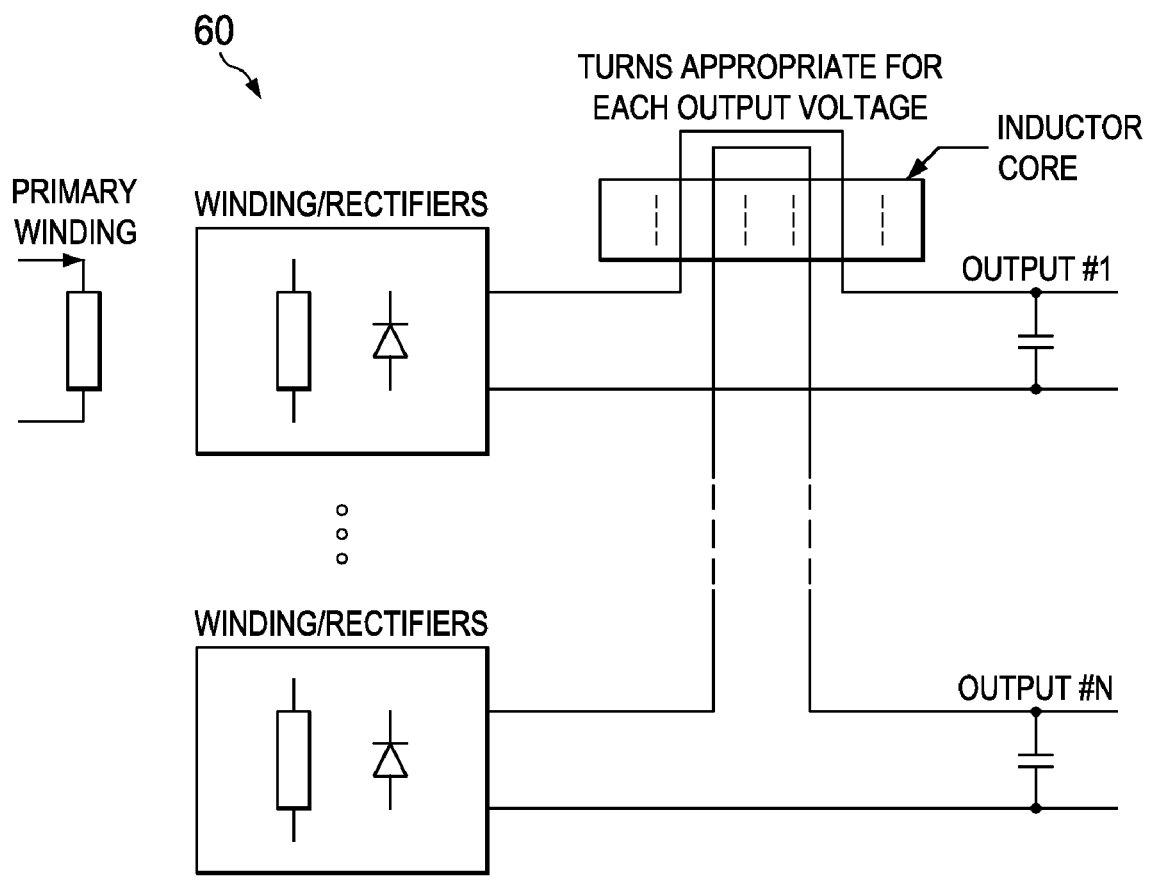
FIG. 4 is a circuit diagram of a full duty transformer stage in accordance with a preferred embodiment of the present invention.

Referring to FIG. 4, there is illustrated portion of the primary winding of a transformer 60 that may be used in accordance with a preferred embodiment of the present invention. Here, the approach to overcome the deficiency of the tracking boost converter, namely, that it has variable output voltage, has been to use a buck converter stage with a subsequent full duty cycle transformer stage. This full duty cycle stage is optimal also for providing self-driven control of synchronous rectifiers, with minimal deadtime and consequently minimal losses.

An extension of this approach is to couple additional sets of output windings and synchronous rectifiers, also self driven, which can provide further output voltages which closely track the main output. These voltages can be isolated from each other or may be combined in the established "stacking" approach. If it is desired to optimise cross regulation between such outputs, then using common tracking or windings for the output inductors on a single core is possible, as in FIG. 4. Given the much closer tracking between output voltages than is the norm with diode rectifiers, this approach can be particularly effective in reducing ripple and in improving cross-regulation.

Figure 5:
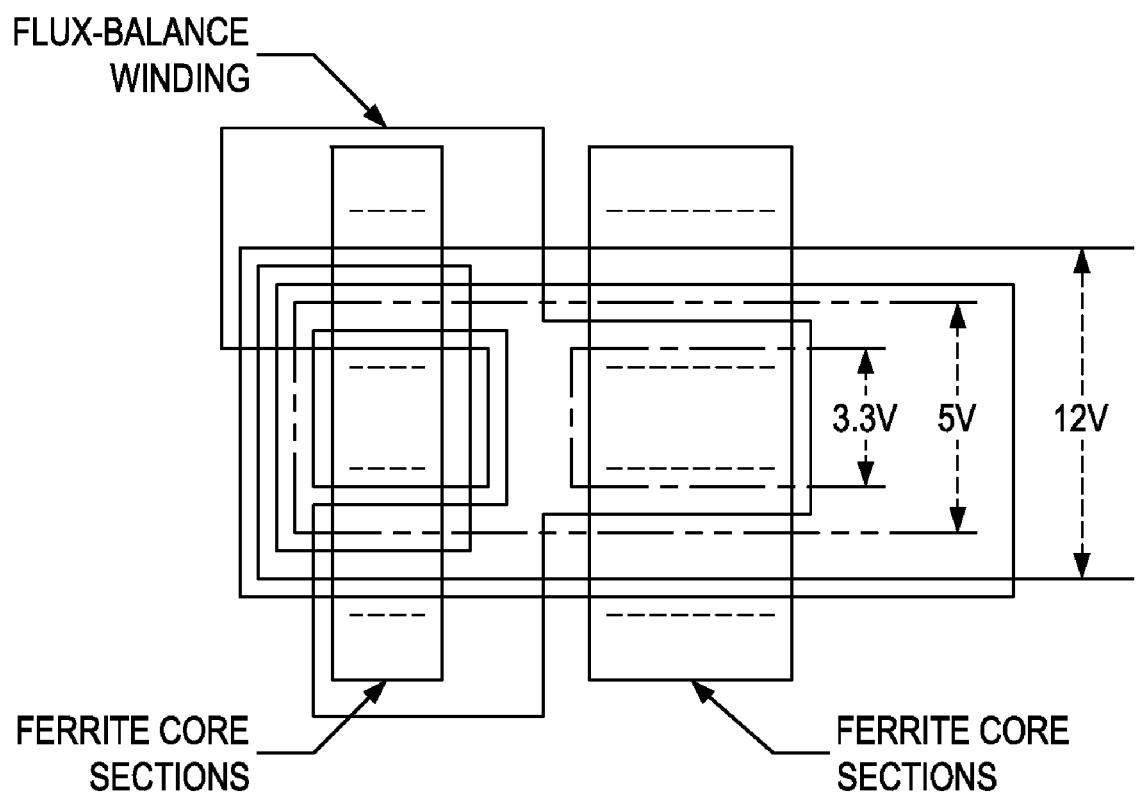
FIG. 5 is a circuit diagram of a multiple output winding configuration for a transformer used in accordance with a preferred embodiment of the present invention.

This approach also lends itself very well to use of approaches suited to get fractional turns. For example, a common requirement is one of getting 3.3V, 5V and 12V nominal output voltages as required in computer systems. An illustrative implementation is as in FIG. 5. This shows only the secondary turns—the primary winding is implemented as conventionally, going through both ferrite sections.

Throughout this specification, the converter has been described as being operated in discontinuous mode at high voltages and in continuous mode at low voltages. It will be understood however that although the controller may be capable of operating the converter in continuous mode at low voltages, practically speaking, it may not in fact be required to do so in the case of a light load on the converter. In this instance, the controller will have the ability to operate in either continuous or discontinuous mode at low voltages depending on the requirements of the load on the converter. Furthermore, the converter may be required to operate in continuous mode at high voltages at least over parts of the cycle if not the entire cycle if there is a particularly large load on the converter.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An alternating current to direct current (AC/DC) converter comprising:
    an AC/DC conversion stage having:
    an input filter that receives an AC input voltage;
    an input rectification circuit that is coupled to the input filter, wherein the input rectification circuit further comprises: a diode bridge that is coupled to the input filter; and an negative temperature coefficient (NTC) thermister that is coupled to the diode bridge;
    a transformer having a first winding and a second winding, wherein each of the first and second winding are coupled to the input rectification circuit;
    a boost diode that is coupled to the first winding of the transformer; and a bulk capacitor that is coupled to the boost diode, wherein the bulk capacitor is configured to store a range of DC voltages that are substantially proportional to the input AC voltage; and a DC/DC conversion stage;
    a pre-regulator buck converter stage that is coupled to the AC/DC conversion stage;
    an output isolation transformer stage that is coupled to the pre-regulator buck converter stage;
    a controller that receives feedback from an output of the AC/DC converter so as to control the pre-regulator buck converter stage.

2. The AC/DC converter as claimed in claim 1, wherein the controller operates the converter in a discontinuous mode at high input voltages and operates the converter in a predominantly continuous mode at low input voltages.

3. The AC/DC converter as claimed in claim 1, wherein the pre-regulator boost converter stage further comprises a hold-up extension circuit having an auxiliary capacitor.

4. The AC/DC converter as claimed in claim 3, wherein the hold-up extension circuit further comprises a standby circuit to charge the auxiliary capacitor.

5. The AC/DC converter as claimed in claim 3, wherein the hold-up extension circuit further comprises a separate boost circuit to charge the auxiliary capacitor.

6. The AC/DC converter as claimed in claim 1, wherein the AC/DC conversion stage further comprises:
    an inductor that is coupled to the second winding of the transformer; and
    a capacitor that is coupled to the inductor.

7. The AC/DC converter as claimed in claim 1, wherein the output isolation transformer stage further comprises a planar transformer with windings integrated in a printed circuit board (PCB).

8. The AC/DC converter as claimed in claim 1, wherein the DC/DC conversion stage further comprises:
    a dump resistor that is coupled to the pre-regulated buck converter stage; and
    a transistor that is coupled in series with the dumb resistor, wherein the transistor is controlled by the controller.

9. The AC/DC converter as claimed in claim 1, wherein the bulk capacitor is chosen to have a capacitance with a hold-up time of the order of 20 milliseconds.

10. The AC/DC converter as claimed in claim 1, wherein the DC/DC conversion stage further comprises a full duty cycle stage that is coupled between the pre-regulator buck converter stage and the output isolation transformer stage.

11. An apparatus comprising:
    an AC/DC conversion stage having:
    an electromagnetic interference (EMI) filter that receives an AC input voltage;
    a full wave bridge that is coupled to the EMI filter;
    an NTC thermister that is coupled to the full wave bridge;
    a first transformer having a first winding and a second winding, wherein each of the first and second windings are coupled to the NTC thermister;
    a diode that is coupled to the first winding of the first transformer;
    a capacitor that is coupled between the diode and the full wave bridge;
    a hold-up circuit that is coupled across the capacitor;
    an DC/DC conversion stage having:
    a buck converter stage that is coupled across the capacitor;
    a protection circuit that is coupled to the buck converter;
    a full duty cycle stage that is coupled to the protection circuit;
    a second transformer having a primary winding and a plurality of secondary windings, wherein the primary winding of the second transformer is coupled to the full duty cycle stage; and
    a controller that receives feedback from an output of the AC/DC converter so as to control the buck converter stage.

12. The apparatus of claim 11, wherein the protection circuit further comprises;

a resistor that is coupled to the buck converter; and a transistor that is coupled in series with the resistor, wherein the transistor is controlled by the controller.

13. The apparatus of claim 11, wherein the AC/DC conversion stage further comprises:

a second diode that is coupled between the EMI filter and the first transformer; and a third diode that is coupled between the EMI filter and the first transformer.

14. The apparatus of claim 11, wherein the AC/DC conversion stage further comprises:

an inductor that is coupled to the second winding of the first transformer; and a second capacitor that is coupled between the inductor and the full wave bridge.

* * * * *